United States Patent
Toge et al.

(10) Patent No.: US 11,280,668 B2
(45) Date of Patent: Mar. 22, 2022

(54) DISTRIBUTED OPTICAL FIBER VIBRATION MEASUREMENT DEVICE AND DISTRIBUTED OPTICAL FIBER VIBRATION MEASUREMENT METHOD

(71) Applicant: Nippon Telegraph and Telephone Corporation, Tokyo (JP)

(72) Inventors: Kunihiro Toge, Musashino (JP); Daisuke Iida, Musashino (JP); Shingo Ono, Musashino (JP); Yoshifumi Wakisaka, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/256,532

(22) PCT Filed: Jun. 19, 2019

(86) PCT No.: PCT/JP2019/024393
§ 371 (c)(1),
(2) Date: Dec. 28, 2020

(87) PCT Pub. No.: WO2020/008886
PCT Pub. Date: Jan. 9, 2020

(65) Prior Publication Data
US 2021/0278272 A1    Sep. 9, 2021

(30) Foreign Application Priority Data

Jul. 2, 2018 (JP) .............................. JP2018-126186

(51) Int. Cl.
*G01H 9/00* (2006.01)
*G02B 6/35* (2006.01)

(52) U.S. Cl.
CPC ........... *G01H 9/004* (2013.01); *G02B 6/3598* (2013.01)

(58) Field of Classification Search
CPC ...... G01H 9/004; G02B 6/3598; G01M 11/02
See application file for complete search history.

(56) References Cited

U.S. PATENT DOCUMENTS 9,435,668 B2 * 9/2016 Lewis ...................... G01D 1/00
9,746,393 B2 * 8/2017 Godfrey ................. G01H 9/004
(Continued)

OTHER PUBLICATIONS

G. Tu et al., *The Development of an Φ-OTDR System for Quantitative Vibration Measurement*, Photonics Technology Letters, vol. 27, No. 10, 2015, pp. 1349-1352.
(Continued)

*Primary Examiner* — John Bedtelyon
(74) *Attorney, Agent, or Firm* — Workman Nydegger

(57) ABSTRACT

A distributed optical fiber vibration measurement device includes a phase constant difference computation unit causing the first backscattered light generated at the points of a plurality of optical fibers under test that are integrated to interfere with another light to obtain two AC components and determining a phase constant difference from the two AC components, a phase distribution data creation unit comparing amplitudes between the two AC components obtained by causing the first backscattered light generated at the points of the optical fibers under test to interfere with the other light and selecting, for each of the points, phase data regarding one of the two AC components having a larger amplitude to create phase distribution data with the phase data, and a vibration measurement unit identifying an optical path length difference between any two points of the optical fiber under test to measure vibration of the optical fiber under test.

6 Claims, 11 Drawing Sheets

(56) References Cited

U.S. PATENT DOCUMENTS 9,841,301 B2 * 12/2017 Wei .................... H01S 5/06832
2021/0215532 A1 * 7/2021 Okamoto ............... G01H 9/004

OTHER PUBLICATIONS

A. E. Alekseev et al., *A Phase-Sensitive Optical Time-Domain Reflectometer with Dual-Pulse Diverse Frequency Probe Signal*, Laser Physics, vol. 25, No. 6, 2015, pp. 1-10.

K. Shimizu et al., *Characteristics and Reduction of Coherent Fading Noise in Rayleigh Backscattering Measurement for Optical Fibers and Components*, Journal of Lightwave Technology, vol. 10, No. 7, 1992, pp. 982-987.

\* cited by examiner

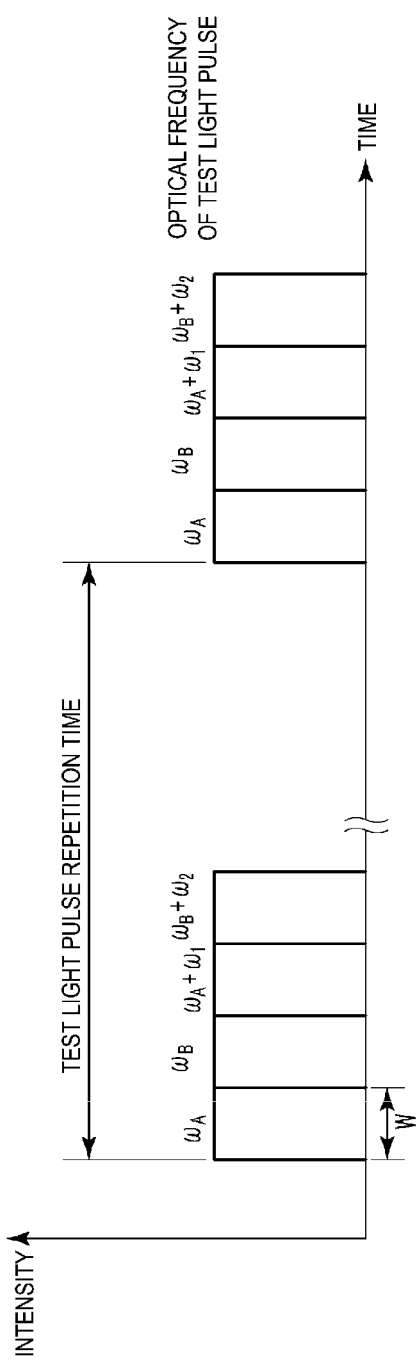

DISTRIBUTED OPTICAL FIBER VIBRATION MEASUREMENT DEVICE AND DISTRIBUTED OPTICAL FIBER VIBRATION MEASUREMENT METHOD

TECHNICAL FIELD

The present disclosure relates to a distributed optical fiber vibration measurement device that uses optical fibers as a sensor to measure sonic waves or vibration applied to positions of the optical fibers.

BACKGROUND ART

An optical time-domain reflectometer (OTDR) is a method or device that delivers test light pulses to optical fibers under test, and receives and analyzes Rayleigh backscattered light from the optical fibers under test (hereinafter simply referred to as backscattered light) to measure a backscattered light intensity distribution (hereinafter referred to as an OTDR waveform) of the light at a plurality of points of the optical fibers under test.

In an OTDR with a light source emitting coherent light, when test light pulses propagate through optical fibers under test, results of the interference, during the duration of the test light pulses, between individual rays of scattered light from a large number of randomly presenting scattering points on the optical fibers are extracted as signals. Thus, the distribution of scattered light intensity at the plurality of points of the optical fibers under test has a zigzag waveform that randomly rises and falls with respect to the length direction of the optical fibers under test (the random rise and fall of the intensity is hereinafter referred to as fading). The same zigzag waveform is obtained no matter how many times measurement is made unless the optical frequency of the coherent light or the state of the optical fibers changes.

On the other hand, when the sonic wave or vibration (hereinafter collectively referred to as vibration) reaches a portion of each of the optical fibers through a gas, a liquid, a solid, or the like, a very slight change in optical path length, i.e. strain, occurs in the optical fiber, and only the scattered light intensity of the portion varies randomly. Thus, vibration frequency is measured from a vibration position and the period of the variation.

The backscattered light intensity varies randomly with respect to the variation and thus does not exhibit a linear response to the intensity of vibration applied to the optical fiber. In contrast, a method of directly extracting a phase component of the backscattered light using a heterodyne detection method or the like has the feature that a temporal change in phase difference between two points on the optical fiber under test has an approximately linear relationship with vibration amplitude, thus allowing the amplitude and frequency of the vibration applied to the optical fiber to be determined more accurately.

For example, NPL 1 proposes a distributed optical fiber vibration measurement method using a heterodyne detection method in which output light from a light source emitting coherent light is branched into test light and local light by an optical directional coupler and in which, with a frequency shift applied to either the test light or the local light, balance detection is performed. According to the measurement method using the heterodyne detection method, a beat signal generated by interference between the local light and the backscattered light is detected as an electrical signal. An AC component $i_{AC}(t)$ of the beat signal is given by (Expression 1) below in a one-dimensional scattering model with a plurality of scatterers one-dimensionally aligned on the optical fibers, with respect to the output time t and the optical angular frequency $\omega$ of the coherent light from the light source (angular frequency is hereinafter abbreviated as the frequency), a frequency shift $\Delta\omega_A$, and the pulse width W of test light pulses.

Math. 1

$$i_{AC}(t) \propto 2E_L E_S \sum_{i=1}^{N} a_i \cos\{\Delta\omega_A i - \Delta\omega_A \tau_i + \theta(t - \tau_i) - \theta(t) + \theta_{FUT}(\tau)\} \cdot rect\left(\frac{t - \tau_1}{W}\right)$$ (Expression 1)

Here, $E_L$ and $E_S$ are respectively electric field amplitudes of local light and test light, N is the number of scatterers present in the length direction of the optical fiber under test, i ($1 \leq i \leq N$) is the number of each scatterer, $a_i$ is reflectance of the scatterer, $\tau_i$ is the round-trip propagation delay time from an incident end of the optical fiber under test to the scatterer i, $\theta(t)$ is an initial phase of the test light, and $\theta_{FUT}(\tau)$ is a phase change caused by vibration applied to the optical fiber under test and is an object to be measured. Additionally, an argument $\tau$ of $\theta_{FUT}$ is a position of the optical fiber under test in the length direction as expressed in propagation time within the optical fiber under test.

The AC component is mixed with a sinusoidal electrical signal having the same frequency as a beat frequency. The resultant signal is digitized and then subjected to signal processing into a baseband signal. The phase component of the AC component is computed by using a measure such as Hilbert transform or 90° hybrid to create a sin component and finding the arctangent of the sin component. In (Expression 1) described above, with a phase component of a cos term focused on, a second term $\Delta\omega_A \tau_i$ corresponds to the optical frequency or an initial phase term specifically related to the optical fiber, and is a constant that is invariable with respect to time unless the optical frequency of the coherent light changes. A third term $\theta(t-\tau_i)-\theta(t)$ means phase noise from the light source. However, the phase difference between two points on the optical fiber involving very similar delay times Ti is computed, and thus the third term is eventually substantially negligible in a case where a delay time difference T between the two points is very small relative to the coherence length of the light source.

In NPL 2, a technique has been proposed in which, subsequently to the test light pulse, another test light pulse with a shifted frequency is made incident with a time difference instead of the local light, and in which the interference between rays of backscattered light of the plurality of test light pulses is heterodyne-detected. In this technique, the AC component $i_{AC}(t)$ of the beat signal generated by a photodetection receiver is expressed as (Expression 2) below.

Math. 2

$$i_{AC}(t) \propto 2E_S^2 \sum_{i=1}^{N} \sum_{j=1}^{N} a_i a_j \cos\left[\Delta\omega_A t + \omega\tau_i - (\omega + \Delta\omega_A)\tau_j + \theta(t - \tau_i) - \theta(t - \tau_j) + \theta_{FUT}(\tau)\right] \cdot rect\left(\frac{t - \tau_i}{W}\right) \cdot rect\left(\frac{t - \tau_j}{W}\right)$$ (Expression 2)

Here, similarly, with a phase component in cos focused on, $\omega \tau_i - (\omega + \Delta \omega_A) \tau_j$ is the optical frequency or the initial phase term specifically related to the optical fiber, and is a constant that is invariable with respect to time unless the optical frequency of the coherent light changes. $\theta(t-\tau_i) - \theta(t-\tau_j)$ means phase noise from the light source. However, the time difference and pulse width W provided for the plurality of test light pulses have a very small delay time difference $|\tau_i - \tau_j|$ from the coherence length of the light source, and in actuality, the phase noise is substantially negligible.

As described above, in any of the techniques described above, the sum of $\theta_{FUT}(T)$ and the optical frequency or the initial phase term specifically related to the optical fiber, which is a constant, is obtained from the AC component of the heterodyne-detected beat signal, and this is repeatedly performed to obtain measurement results in which $\theta_{FUT}(\tau)$, varying temporally, is offset from the initial phase constant. Thus, the information regarding only $\theta_{FUT}(\tau)$, varying temporally, is extracted, enabling analysis of, for example, the amplitude and frequency of the vibration applied to the optical fiber under test.

CITATION LIST

Non Patent Literature

NPL 1: G. Tu et al, "The development of an Φ-OTDR system for quantitative vibration measurement", Photonics Technology letters, Vol. 27, No. 10, pp. 1349-1352 (2015)

NPL 2: A. E. Alekseev et al, "A phase-sensitive optical time-domain reflectometer with dual-pulse diverse frequency probe signal", Laser Physics, Vol. 25, No. 6 (2015)

NPL 3: K. Shimizu et al. "Characteristics and reduction of coherent fading noise in Rayleigh backscattering measurement for optical fibers and components", Journal of Lightwave Technology, Vol. 10, No. 7, pp. 982-987 (1992)

SUMMARY OF THE INVENTION

Technical Problem

However, in any of the measures in NPL 1 and NPL 2, the AC component of the beat signal described above is treated as a signal, but as illustrated in FIG. 1, the signal intensity, on which the treatment is based, increases and decreases repeatedly with respect to the length direction of the optical fiber under test due to fading, and thus smaller values of the signal intensity may be close to or lower than the noise level of the optical detector. When computed for portions with a low signal-to-noise ratio, the vibration $\theta_{FUT}(\tau)$ applied to the optical fiber under test involves high phase noise, and for example, the noise from the optical detector may disadvantageously cause vibration to be detected even though the portions are not actually vibrating. The noise caused by such fading and causing false detection of vibration is referred to as fading noise.

The magnitude of the beat signal intensity, varied by fading, is uniquely determined by the optical frequency and the optical fiber-specific state, and thus generation of the fading noise is unavoidable. To solve the problem of fading, for example, NPL 3 describes a measure for changing the optical frequency of the repeatedly incident test light pulse each time the test light pulse is incident. However, disadvantageously, a plurality of beat signals are averaged for use, resulting in a reduced temporal sampling frequency of vibration.

In view of the aforementioned problems on known art, an object of the present disclosure is to provide a distributed optical fiber vibration measurement device receiving and analyzing backscattered light from optical fibers under test to measure sonic waves or vibration applied to a plurality of positions of the optical fibers, the distributed optical fiber vibration measurement device enabling a reduction in the influence of fading noise, which is a problem with such a distributed optical fiber vibration measurement device, and being capable of accurately and sensitively measuring vibration.

Means for Solving the Problem

To solve the above problem, a distributed optical fiber vibration measurement device according to one embodiment is a distributed optical fiber vibration measurement device for causing a first test light pulse to enter a plurality of optical fibers under test that are integrated to generate first backscattered light at points of the plurality of optical fibers under test and heterodyne-detecting the first backscattered light to measure vibration applied to positions of an optical fiber under test of the plurality of optical fibers under test, the distributed optical fiber vibration measurement device including, a phase constant difference computation unit configured to cause the first backscattered light generated at the points of the plurality of optical fibers under test to interfere with another light having an optical frequency different from an optical frequency of the first test light pulse to obtain two AC components and determine a phase constant difference from the two AC components, a phase distribution data creation unit configured to compare amplitudes between the two AC components obtained by causing the first backscattered light generated at the points of the plurality of optical fibers under test to interfere with the other light and select, for each of the points, phase data regarding an AC component of the two AC components having a larger amplitude to create phase distribution data with the phase data arranged over time, and a vibration measurement unit configured to identify, from the phase constant difference and the phase distribution data, an optical path length difference between any two points of the optical fiber under test to measure vibration of the optical fiber under test.

A distributed optical fiber vibration measurement device according to another embodiment is a distributed optical fiber vibration measurement device for causing a first test light pulse and a second test light pulse having an optical frequency different from an optical frequency of the first test light pulse to enter an optical fiber under test to generate first backscattered light and second backscattered light at points of the optical fiber under test and heterodyne-detecting the first backscattered light and the second backscattered light to measure vibration applied to positions of the optical fiber under test, the distributed optical fiber vibration measurement device including, a phase constant difference computation unit configured to cause the first backscattered light and the second backscattered light to interfere respectively with another light having an optical frequency different from optical frequencies of the first test light pulse and the second test light pulse to obtain two AC components and determine a phase constant difference from the two AC components, a phase distribution data creation unit configured to compare amplitudes between the two AC components obtained by causing the first backscattered light and the second backscattered light to interfere with the other light respectively and select, for each of the points, phase data regarding an AC component of the two AC components having a larger amplitude to create phase distribution data with the phase data arranged over time, and a vibration measurement unit configured to identify, from the phase constant difference and the phase distribution data, an optical path length difference between any two points of the optical fiber under test to measure vibration of the optical fiber under test.

A distributed optical fiber vibration measurement method according to one embodiment is a distributed optical fiber vibration measurement method of causing a first test light pulse to enter a plurality of optical fibers under test that are integrated to generate first backscattered light at points of the plurality of optical fibers under test and heterodyne-detecting the first backscattered light to measure vibration applied to positions of an optical fiber under test of the plurality of optical fibers under test, the distributed optical fiber vibration measurement method including, causing the first backscattered light generated at the points of the plurality of optical fibers under test to interfere with another light having an optical frequency different from an optical frequency of the first test light pulse to obtain two AC components and determining a phase constant difference from the two AC components, comparing amplitudes between the two AC components obtained by causing the first backscattered light generated at the points of the plurality of optical fibers under test to interfere with the other light and selecting, for each of the points, phase data regarding an AC component of the two AC components having a larger amplitude to create phase distribution data with the phase data arranged over time, and identifying, from the phase constant difference and the phase distribution data, an optical path length difference between any two points of the optical fiber under test to measure vibration of the optical fiber under test.

A distributed optical fiber vibration measurement method according to another embodiment is a distributed optical fiber vibration measurement method of causing a first test light pulse and a second test light pulse having an optical frequency different from an optical frequency of the first test light pulse to enter an optical fiber under test to generate first backscattered light and second backscattered light at points of the optical fiber under test and heterodyne-detecting the first backscattered light and the second backscattered light to measure vibration applied to positions of the optical fiber under test, the distributed optical fiber vibration measurement method including, causing the first backscattered light and the second backscattered light to interfere respectively with another light having an optical frequency different from optical frequencies of the first test light pulse and the second test light pulse to obtain two AC components and determining a phase constant difference from the two AC components, comparing amplitudes between the two AC components obtained by causing the first backscattered light and the second backscattered light to interfere with the other light respectively and selecting, for each of the points, phase data regarding an AC component of the two AC components having a larger amplitude to create phase distribution data with the phase data arranged over time, and identifying, from the phase constant difference and the phase distribution data, an optical path length difference between any two points of the optical fiber under test to measure vibration of the optical fiber under test.

BRIEF DESCRIPTION OF DRAWINGS

FIG. 11 is a diagram illustrating a test light pulse delivery sequence according to the fourth embodiment of the present disclosure.

DESCRIPTION OF EMBODIMENTS

Figure 1:
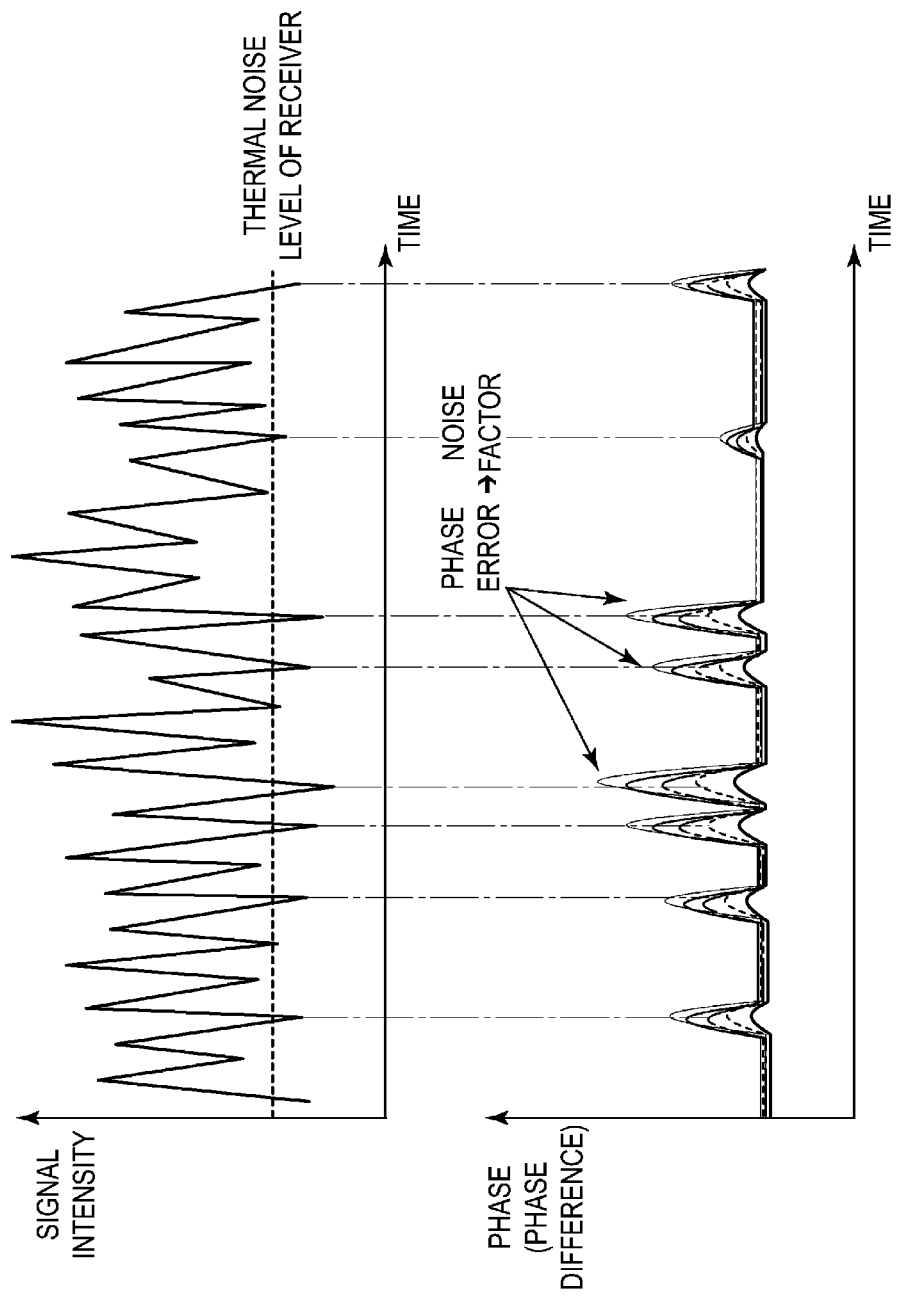
FIG. 1 is a block configuration diagram illustrating a distributed optical fiber vibration measurement device of a first embodiment of the present disclosure.

Embodiments of the present disclosure will be described in detail below with reference to the drawings.

A distributed optical fiber vibration measurement device described in the embodiments causes a first test light pulse obtained by frequency-shifting light from a light source to enter each of an integrated plurality of test optical fibers. The distributed optical fiber vibration measurement device causes first backscattered light generated at a plurality of points of the plurality of optical fibers under test to interfere with another light for heterodyne detection to measure vibration applied to each of the positions of the optical fiber under test. The distributed optical fiber vibration measurement device includes a phase constant difference computation unit, a phase distribution data creation unit, and vibration measurement unit. The phase constant difference computation unit causes the first backscattered light generated at the plurality of points of the plurality of optical fibers under test to interfere with the other light, and determines a phase constant difference from two AC components obtained. The phase distribution data creation unit causes the first backscattered light generated at the plurality of points of the plurality of optical fibers under test to interfere with the other light and compares the amplitudes between two AC components obtained. Then, the phase distribution data creation unit selects phase data regarding the AC component with the larger amplitude for each of the plurality of points and arranges the phase data over time to create phase distribution data. The vibration measurement unit identifies, from the phase constant difference and the phase distribution data, an optical path length difference between any two points of each of the optical fibers under test to measure vibration of the optical fiber under test.

In addition, the distributed optical fiber vibration measurement device described in the embodiments causes a first test light pulse and a second test light pulse to enter optical fibers under test, the first test light pulse being obtained by subjecting light from a light source to a first frequency shift and the second test light pulse being obtained by subjecting light from the light source to a second frequency shift. The distributed optical fiber vibration measurement device causes first backscattered light and second backscattered light generated at a plurality of points of the optical fibers under test to interfere with another light for heterodyne detection, and measures vibration applied to a plurality of positions of the optical fibers under test. The distributed optical fiber vibration measurement device includes a phase constant difference computation unit, a phase distribution data creation unit, and a vibration measurement unit. The phase constant difference computation unit causes each of the first backscattered light and the second backscattered light to interfere with another light to obtain two AC components, and determines a phase constant difference from the two AC components. The distribution data creation unit compares the amplitudes between two AC components obtained by causing each of the first backscattered light and the second backscattered light to interfere with the other light. The distribution data creation unit selects phase data regarding the AC component with the larger amplitude for each of the plurality of points and arranges the phase data over time to create phase distribution data. The vibration measurement unit identifies, from the phase constant difference and the phase distribution data, an optical path length difference between any two points of each of the optical fibers under test to measure vibration of the optical fiber under test.

Figure 2:
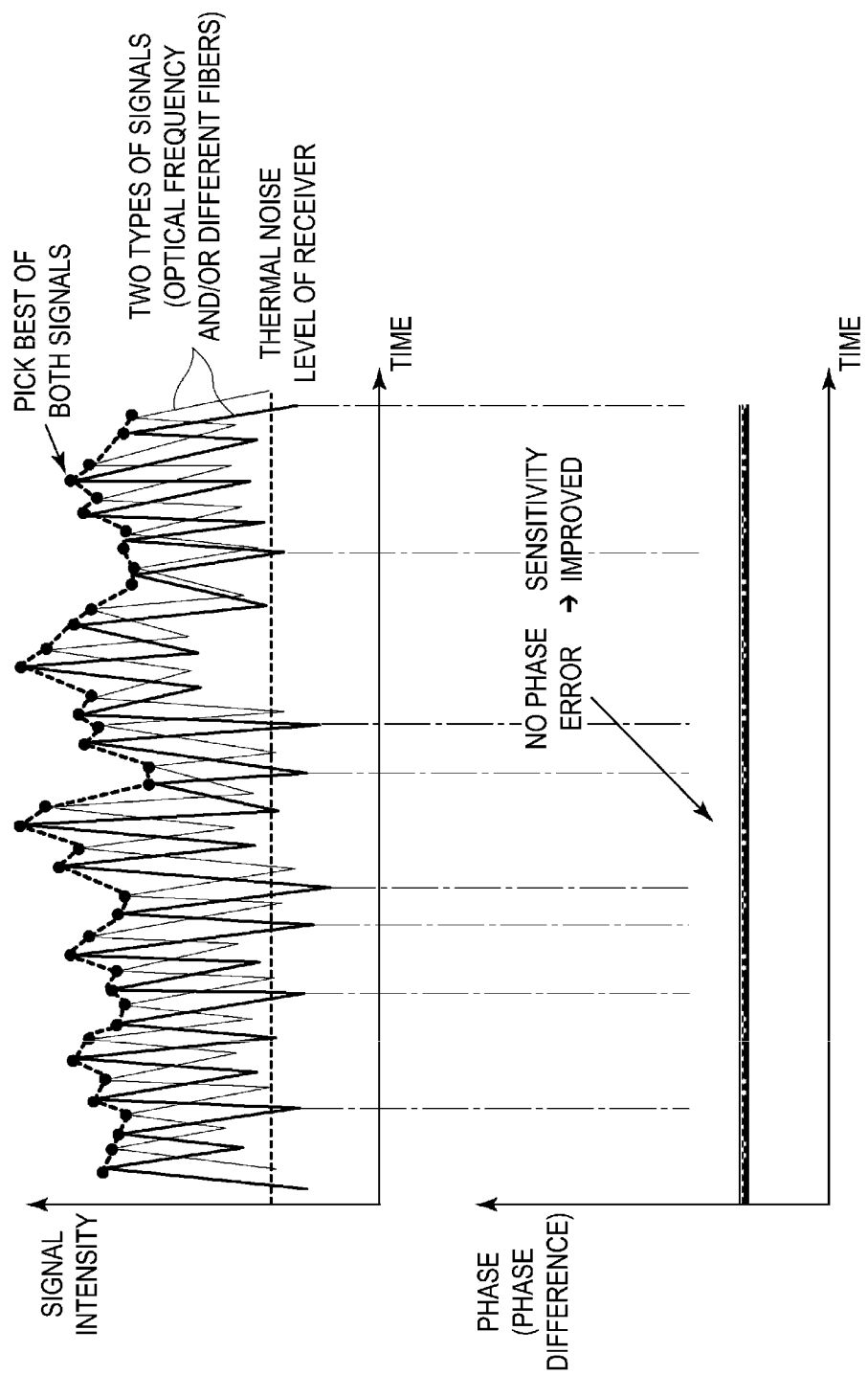
FIG. 2 is a diagram illustrating a test light pulse delivery sequence according to the first embodiment of the present disclosure.

According to the distributed optical fiber vibration measurement device, by selecting and employing one of the two types of signals having a higher signal intensity as illustrated in FIG. 2, vibration detection can be performed by using a signal with a high signal-to-noise ratio, thus reducing the influence of fading noise. In a method for utilizing local light and backscattered light of a test light pulse resulting from a frequency shift to heterodyne-detect interference between the local light and the backscattered light, an accurate and sensitive distributed optical fiber vibration measurement can be achieved with fading noise reduced. Alternatively, in a method for heterodyne-detecting interference between rays of backscattered light by using a plurality of test light pulses frequency-shifted from each other, accurate and sensitive distributed optical fiber vibration measurement can be achieved with fading noise reduced. Furthermore, the distributed optical fiber vibration measurement device can contribute to reducing noise caused by optical frequency drift, which is involved in fading noise and which causes noise when low-frequency vibration is measured.

First Embodiment

Figure 3:
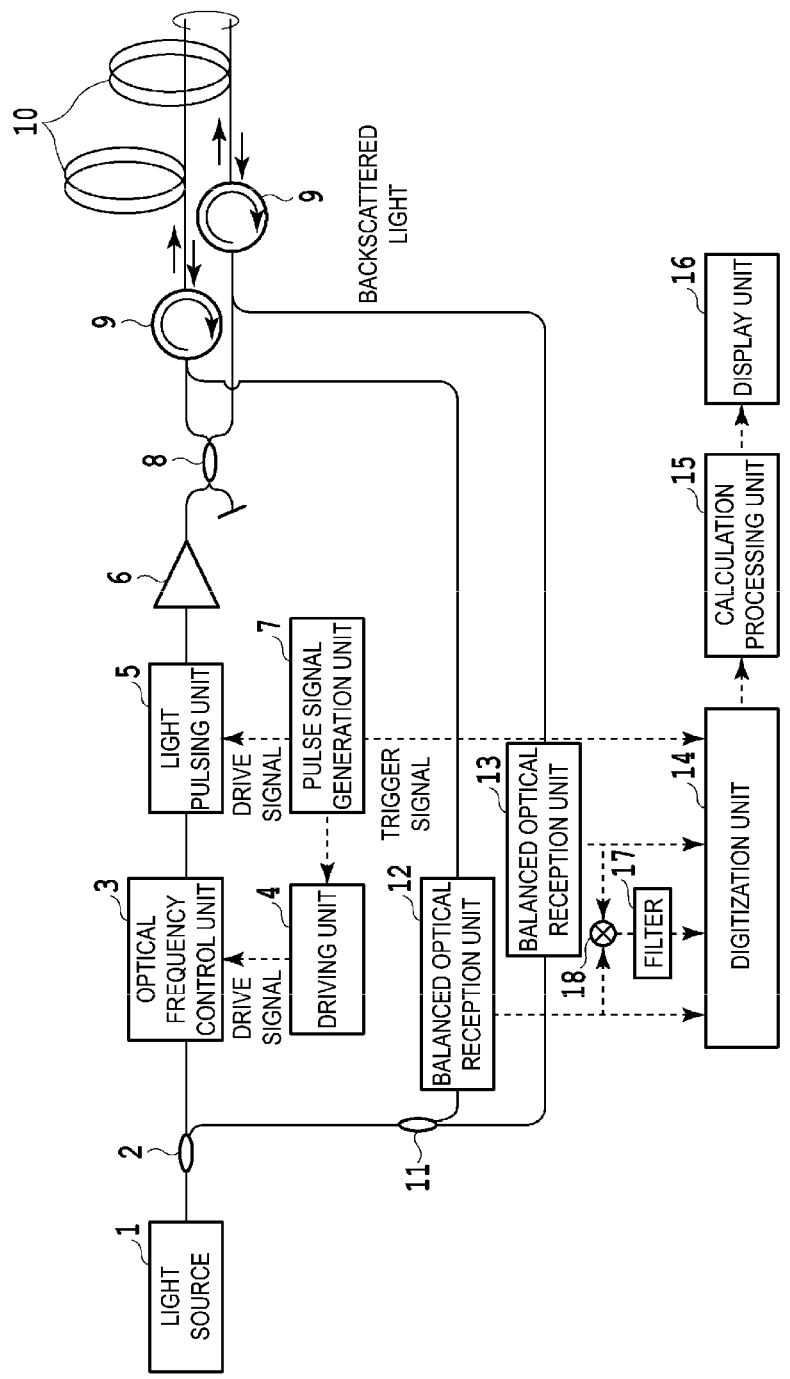
FIG. 3 is a block configuration diagram illustrating a distributed optical fiber vibration measurement device of a first embodiment of the present disclosure.

FIG. 3 is a block configuration diagram illustrating a distributed optical fiber vibration measurement device according to a first embodiment. The distributed optical fiber vibration measurement device of the present embodiment branches light from a single light source into rays of light used as test light and local light, multiplexes backscattered light with the local light for heterodyne detection, and acquires, from the optical detection unit, AC components of two electrical signals. Here, the backscattered light is obtained by causing test light to simultaneously enter two different optical fibers under test.

Output light from a light source 1 emitting coherent light is branched into two lines by a branching element 2. One ray of the branched light is used as local light, whereas the other is incident on an optical frequency control unit 3 as test light. The optical frequency control unit 3 applies a frequency shift $\Delta\omega_A$ between the test light and the local light.

The test light from the optical frequency control unit 3 is converted into a single pulse by the light pulsing unit 5, and the pulse is caused to enter two optical fibers under test 10 via an optical amplifier 6 and a branching element 8. The light pulsing unit 5 is driven by a drive signal from a pulse signal generation unit 7. Backscattered light generated in the optical fibers under test 10 is multiplexed with the local light fed from the branching element 11 via an optical circulator 9, and the resultant light is converted into electrical signals by balanced optical reception units 12 and 13. The balanced optical reception units 12 and 13 can multiplex the backscattered light with the local light for heterodyne detection to acquire AC components of the two electrical signals.

Outputs from the balanced optical reception units 12 and 13 are partially branched, the partial outputs are mixed by a mixer 18, and from the resultant signal, high frequency components are removed via a filter 17. Then, the signal is converted to a digital signal by a digitization unit 14, and the digital signal is processed by a calculation processing unit 15. Additionally, output signals from the balanced optical reception units 12 and 13 are input to the digitization unit 14 similarly to the input to the mixer 18, and converted into digital signals by the digitization unit 14, and the digital signals are processed by the calculation processing unit 15.

The results of the signal processing by the calculation processing unit 15 are displayed on the display unit 16 as appropriate.

Here, the two optical fibers under test need to be integrated in such a manner as to be vibrated in the same manner. The integration refers to a state in which the two optical fibers under test are physically bound to be vibrated in the same manner. Specifically, the optical fibers under test may be bundled in the same coating resin as in an optical fiber tape, or may be tightly formed into a cable, or may have a multiple waveguide structure as in a multi-core optical fiber, for example.

Here, it is sufficient that the optical frequency control unit 3 is specifically an external modulator having a function for changing the optical frequency in accordance with an electrical signal from a driving unit 4 used as a drive source, and as is well known, the function is provided in a phase modulator or an amplitude modulator using an acoustic optical switch or $LiNbO_3$, or an Single Side Band Suppressed Carrier (SSB-SC) modulator.

It is sufficient that the light pulsing unit 5 has a function for converting test light into a pulse, and as is well known, the function is provided in a high-speed variable attenuator, a semiconductor optical amplifier, an acoustic optical switch, and the like. Note that, for the light pulsing unit 5, an acoustic optical switch can be used to provide the function of the optical frequency control unit 3, or a semiconductor optical amplifier can be used to provide the function of the optical amplifier 6.

Figure 4:
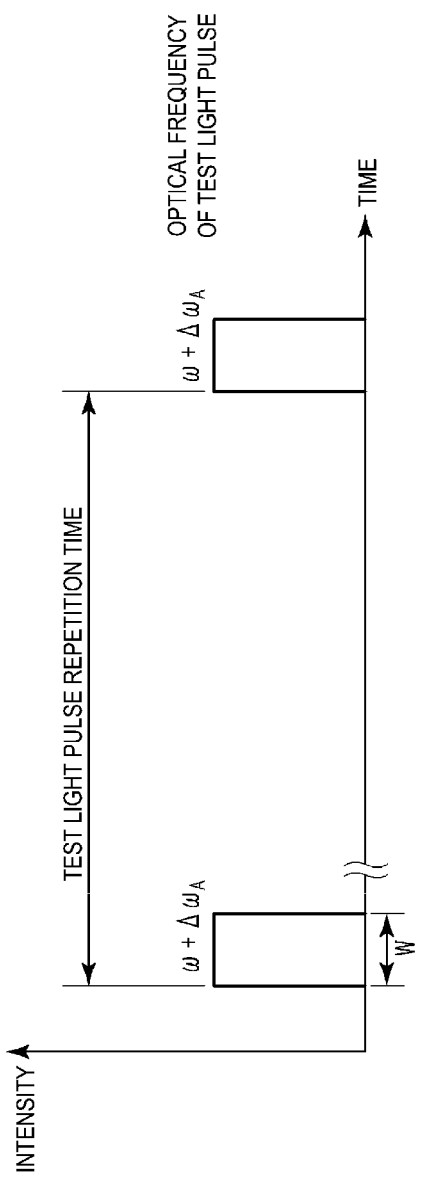
FIG. 4 is a diagram illustrating a test light pulse delivery sequence according to the first embodiment of the present disclosure.

FIG. 4 illustrates a test light pulse delivery sequence according to the present example. The optical frequency of the light from the light source 1 is $\omega$. A test light pulse with an optical frequency $\omega+\Delta\omega_A$ resulting from a frequency shift by the optical frequency control unit 3 is repeatedly pulsed with a pulse width W by the light pulsing unit 5, the pulse is amplified by the optical amplifier 6, and the amplified pulse is branched by the branching element 8 into two pulses, which are then delivered to the respective optical fibers under test 10.

The repetition time of the test light pulse is set equal to or longer than the round-trip propagation delay time of the maximum length of the optical fiber under test 10.

Here, AC components $I_1(t)$ and $I_2(t)$ of beat electrical signals output from the two balanced optical reception unit 12 and 13 are respectively given by (Expression 3) and (Expression 4) below, with respect to the output time t and the optical frequency ω of the coherent light from the light source, the frequency shift $\Delta\omega_A$, and the pulse width W of the test light pulse.

Math. 3

$$I_1(t) \propto 2E_L E_S \sum_{i=1}^{N} a_i \cos\{\Delta\omega_A t - \Delta\omega_A \tau_i + \theta(t - \tau_i) - \theta(t) + \theta_{FUT}(\tau)\} \cdot rect\left(\frac{t-\tau_i}{W}\right) =$$
$$2E_L E_S R_1(t)\cos(\Delta\omega_A t + \theta_1 + \Delta\theta_L(t) + \theta_{FUT}(\tau))$$

(Expression 3)

Math. 4

$$I_2(t) \propto 2E_L E_S \sum_{i=1}^{N} b_i \cos\{\Delta\omega_A t - \Delta\omega_A \tau_i + \theta(t - \tau_i) - \theta(t) + \theta_{FUT}(\tau)\} \cdot rect\left(\frac{t-\tau_i}{W}\right) =$$
$$2E_L E_S R_2(t)\cos(\Delta\omega_A t + \theta_2 + \Delta\theta_L(t) + \theta_{FUT}(\tau))$$

(Expression 4)

Here, $E_L$ and $E_S$ are respectively electric field amplitudes of the local light and the test light, N is the number of scatterers present in the length direction of each of the optical fibers under test, i (1≤i≤N) is the number of each scatterer, $a_i$ and $b_i$ are each the reflectance of the scatterer, $\tau_i$ is the round-trip propagation delay time from an incident end of the optical fiber under test to the scatterer i, θ(t) is an initial phase of the test light, and $\theta_{FUT}(\tau)$ is a phase change caused by vibration applied to the optical fiber under test and is an object to be measured. $R_1(t)$ and $R_2(t)$ are backscattering coefficient distributions of the respective optical fibers under test, and $\Delta\theta_L(t)$ means an initial phase difference of light between the time of output of the test light pulse and the time of interference with the local light, i.e., phase noise from the laser, and is the same between the two optical fibers under test. According to assumed conditions, $\theta_{FUT}(\tau)$ is similarly the same between the two optical fibers under test. $\theta_1$ and $\theta_2$ are each a phase constant attributed to fading, and conditions for interference caused by fading, in other words, scatterers forming the optical fiber, vary among the optical fibers under test, and thus the phase constants differ from each other.

The AC components of (Expression 3) and (Expression 4) are converted into digital signals by the digitization unit 14, and the digital signals are input to the calculation processing unit 15. Note that in the present embodiment, the frequency of the AC component is $\Delta\omega_A$, and the two balanced optical reception units 12 and 13 and the digitization unit 14 require a band of $2\Delta\omega_A$ or higher on the basis of the Nyquist theorem.

Before processing by the digitization unit 14 at the subsequent stage of the two balanced optical reception unit 12 and 13, the electrical signals resulting from branching are synthesized by the mixer 18. A synthetic AC signal which is the synthesized AC signal, is given by the product of the AC components, and is as represented by (Equation 5).

Math. 5

$$I_1(t) \times I_2(t) = 4E_L^2 E_S^2 R_1(t)R_2(t)[\cos\{2(\Delta\omega_x t + \Delta\theta_L(t) + \theta_{FUT}(t)) + \theta_1 + \theta_2\} + \cos(\phi_{1,2})]$$

(Equation 5)

Here, $\phi_{1,2} = \theta_1 - \theta_2$. As seen in (Equation 5), the spectrum of the synthetic AC signal includes a signal component centered at a double frequency of the frequency shift $\Delta\omega_A$ applied by the optical frequency control unit 3 and a signal component with an amplitude modulated into the vicinity of a direct current according to the phase constant difference $|\theta_1 - \theta_2|$. The DC component can be easily separated from the signal component centered at the double frequency of $\Delta\omega_A$ by using a low-pass filter (filter 17).

Next, assuming that i (i=1 or 2) is the number of each AC component, an amplitude $A_i(t)$ and a phase $P_i(t)$ for each of the two AC components represented in (Expression 3) and (Expression 4) are given from the AC components by (Equation 6) and (Equation 7) below.

Math. 6

$$A_i(t) = \sqrt{I_i(t)^2 + H\{I_i(t)\}^2}$$

(Equation 6)

Math. 7

$$P_i(t) = \arctan[H\{I_i(t)\}/I_i(t)] - \Delta\omega_A t$$

(Equation 7)

Here, H{I(t)} means Hilbert transform of a signal I(t) and is an orthogonal signal obtained by shifting the phase of I(t) by 90 degrees. Similarly, by performing Hilbert transform on the DC component of the synthetic AC signal, the phase constant difference $\phi_{1,2}$ can be recognized from the DC component.

Note that, in the above description, all of the amplitude and phase are acquired from the electrical signals represented by (Expression 3) to (Equation 5) by performing Hilbert transform in digital signal processing but that, for example, an optical 90° hybrid may be used instead of the balanced optical reception units 12 and 13. Alternatively, an electrical 90° hybrid may be located following the balanced optical reception units 12 and 13, and the amplitude and phase may be extracted by an analog signal circuit.

Additionally, the synthetic AC signal represented by (Equation 5) may be synthesized by digital signal processing instead of mixing in the analog signal circuit. In this case, mixer 18 and filter 17 in FIG. 3 can be omitted.

Furthermore, the above description involves the use of the DC component of the synthetic AC signal. On the other hand, in a case where the signal component centered at the double frequency of the frequency shift $\Delta\omega_A$ is extracted by the high pass filter, $\Delta\omega_A$ can be monitored through this signal component. By applying the monitored frequency shift $\Delta\omega_A$ to the processing of (Equation 7) instead of assuming the fixed frequency shift $\Delta\omega_A$, the monitored $\Delta\omega_A$ can be used for compensation for $\Delta\omega_A$ in a case described below. The case described below refers to a case where frequency drift is present in the optical frequency control unit 3, with $\Delta\omega_A$ changing slowly. In this case, it should be noted that the band of the digitization unit 14 needs to be $4\Delta\omega_A$ or more in order to correctly acquire the synthetic AC signal in (Equation 5).

Figure 5:
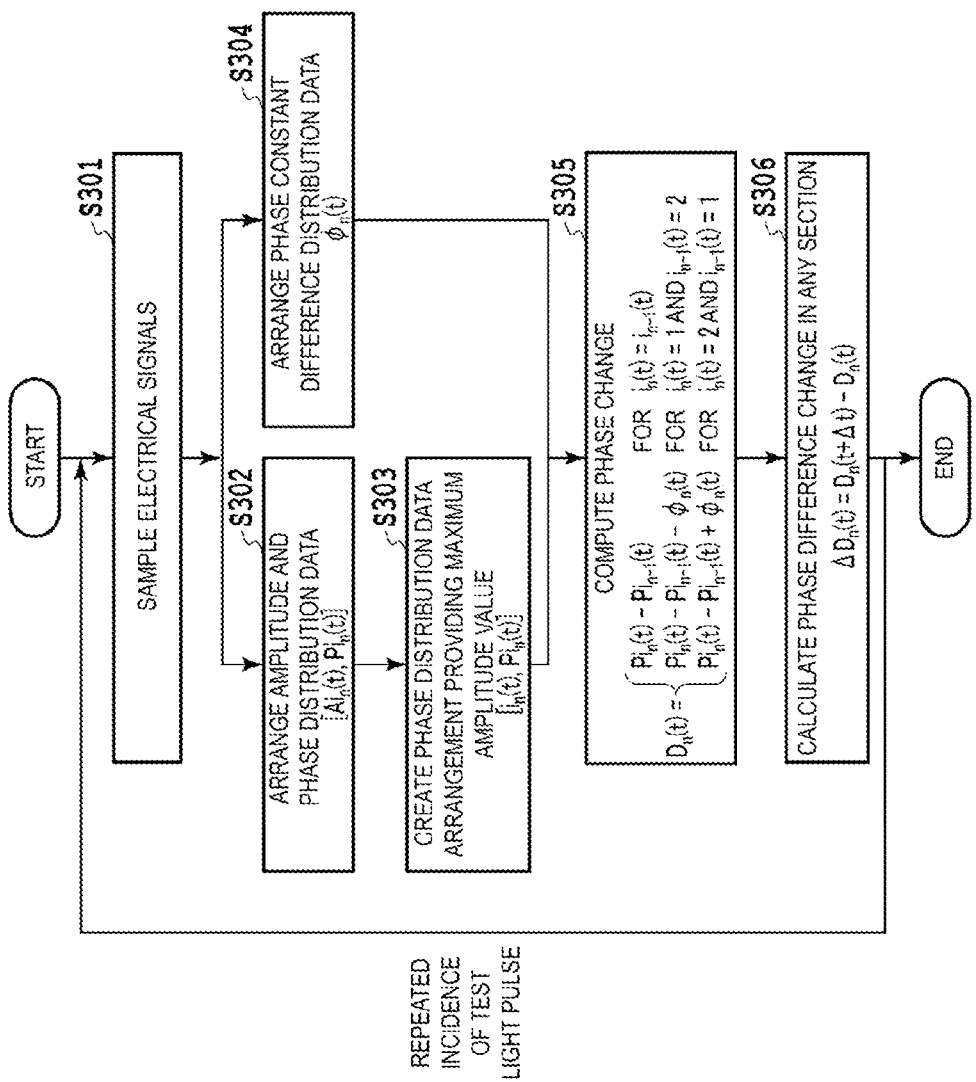
FIG. 5 is a diagram illustrating a calculation processing flow in a calculation processing device according to the first embodiment of the present disclosure.

FIG. 5 illustrates a calculation processing flow of the calculation processing unit of the distributed optical fiber vibration measurement device according to the first embodiment.

After the digitization unit 14 samples the electrical signals (S301), the processing in (Expression 3) to (Equation 7) results in creation of amplitude and phase distribution data for each AC component (S302) and creation, from the synthetic AC component, of distribution data regarding the phase constant difference $\phi_n$ (S304).

After the processing in S302, the distributed optical fiber vibration measurement device compares the amplitudes of the two AC components, selects the AC component with the larger amplitude, and arranges the phase data over time (S303). In S303, due to fading, which of the AC components is selected at each point of the optical fiber under test is random, but selection of the AC component with the larger amplitude results in creation of phase data from a signal with a higher signal-to-noise ratio.

After the processing in the S303 and S304, the distributed optical fiber vibration measurement device computes the phase change amount $D_n(t)$ at the same point of the optical fiber under test, i.e., at the same round-trip propagation delay time (S305). Specifically, the distributed optical fiber vibration measurement device computes a difference from the phase obtained during the preceding incidence of a test light pulse. However, in this computation, in a case where the AC component corresponding to the original data for the phase obtained during the (n−1)-th incidence differs from the AC component of the phase obtained during the n-th incidence, the phase constant difference computed in S304 is present between the phases. Thus, the distributed optical fiber vibration measurement device further executes processing for canceling the phase constant difference from the phase change amount. Note that FIG. 5 illustrates equations for a case where $\phi_{1,2} = \theta_1 - \theta_2$ is used as the phase constant difference $\phi_n$ but that, in a case where $\phi_{2,1} = \theta_2 - \theta_1$ is used as the phase constant difference $\phi_n$, a sign for addition or subtraction of $\phi_n$ may be reversed. Furthermore, in S306, from the phase change amount $D_n(t)$ thus obtained, computation is made of the difference between any two adjacent points of the optical fiber under test, i.e., between two amounts of change in phase $D_n(t)$ having a very small round-trip propagation delay time difference $\Delta t$, with a phase difference change $\Delta D_n(t)$ in any section eventually output. The phase difference change $\Delta D_n(t)$ obtained by causing the repeated incidence of the test light pulse corresponds to a temporal change in optical path length difference between any two adjacent points of the optical fiber under test, that is, a temporal change in the amount of strain, and $\Delta D_n(t)$ corresponds to vibration.

Note that, in the present embodiment, the processing in S306 is executed after the processing in S305 as the calculation processing step but that the processing in S305 may be executed after the processing in S306. Specifically, in this method, after the phase data with a high signal-to-noise ratio is arranged in S303, the phase difference between any two points is computed in S306, and a temporal change in phase difference is computed in S305. This can be easily understood because, in steps S305 and S306, the values for the phase and the phase constant difference are simply subtracted.

As described above, by acquiring two different AC components from the two optical fibers under test and determining and compensating for the phase constant difference from the synthetic AC component, data with a higher signal-to-noise ratio can be selected, enabling accurate vibration measurement. Here, the phase constant difference is a phase constant difference occurring when the AC component used as the original signal from which the phase is computed is different from the signal from which the preceding phase is computed. Note that the description of the present example relates to the two optical fibers under test, but with a reception configuration for acquiring a plurality of electrical signals, two or more optical fibers under test can be used to implement the present embodiment on the assumption that the number of combinations of synthetic AC signals is similarly increased.

Second Embodiment

Figure 6:
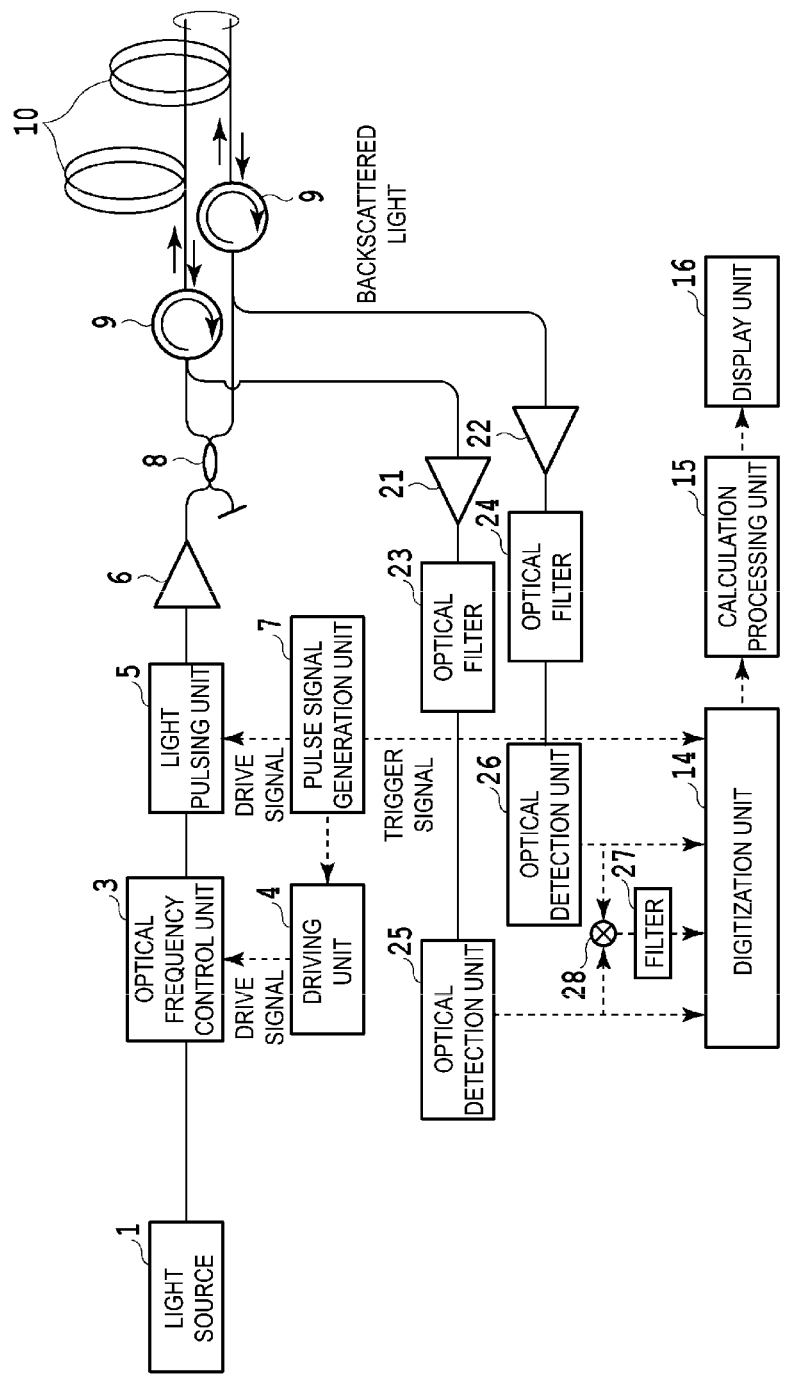
FIG. 6 is a block configuration diagram illustrating a distributed optical fiber vibration measurement device of a second embodiment of the present disclosure.

FIG. 6 is a block configuration diagram illustrating a distributed optical fiber vibration measurement device of a second embodiment. The distributed optical fiber vibration measurement device of the present embodiment uses an optical detection unit to heterodyne-detect interference between rays of backscattered light obtained by causing test light to enter optical fibers under test, and performs this detection on two different optical fibers under test to acquire AC components of two electrical signals. Here, the above-described distributed optical fiber vibration measurement device causes two pulses having different optical frequencies and a time difference to enter the optical fibers under test as the above-described test light. The distributed optical fiber vibration measurement device of the present embodiment does not require the local light used in the first embodiment. In other words, the present embodiment differs from the first embodiment in a unit for acquiring AC components of two electrical signals, and only differences in configuration and signal processing involved in the above-described change will be described below.

Output light from the light source 1 emitting coherent light is incident on the optical frequency control unit 3 as test light. The optical frequency control unit 3 modulates the optical frequency in two stages at predetermined time intervals. The optical frequency difference at this time is $\Delta \omega_A$. For the test light, the light pulsing unit 5 forms two pulses having a first optical frequency $\omega$ and a second optical frequency $\omega + \Delta \omega_A$, and causes the pulses to enter the two optical fibers under test 10 via the optical amplifier 6 and the branching element 8.

Rays of backscattered light generated in the optical fibers under test 10 travel through the optical circulators 9 and are pre-amplified by an optical amplifier 21 and an optical amplifier 22, and the rays of light then travel through optical filters 23 and 24 for removing spontaneous emissions from the optical amplifiers 21 and 22 and are converted into electrical signals by optical detection units 25 and 26. The optical detection units 25 and 26 multiplexes two rays of backscattered light with different optical frequencies for heterodyne detection, and the distributed optical fiber vibration measurement device can acquire AC components of two electrical signals from the optical detection units 25 and 26.

Two outputs from the optical detection units 25 and 26 are partially branched, and the partial outputs are input to a mixer 28, in which the partial outputs are multiplexed. Then, high frequency components are removed from the multiplexing results via a filter 27, and the resultant signal is converted into digital signal by the digitization unit 14. Then, the digital signal is subjected to signal processing by the calculation processing unit 15. Additionally, similarly to being branched and input to the mixer 28, the two output signals from the optical detection units 25 and 26 are input to the digitization unit 14, and the signals are converted into digital signals by the digitization unit 14. The digital signals are subjected to signal processing in the calculation processing unit 15.

Figure 7:
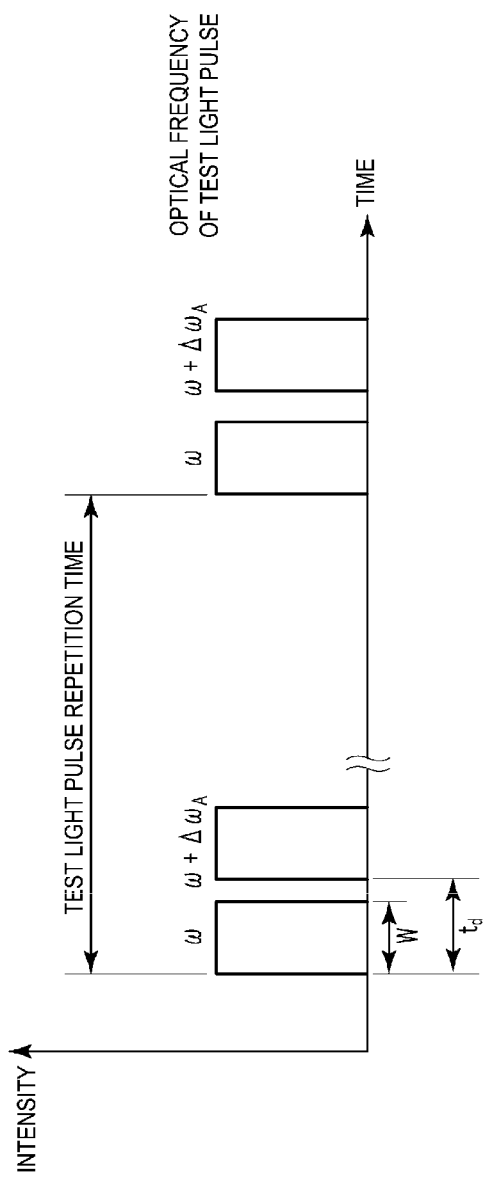
FIG. 7 is a diagram illustrating a test light pulse delivery sequence according to the second embodiment of the present disclosure.

FIG. 7 illustrates a test light pulse delivery sequence according to the present embodiment. Two test light pulses are repeatedly delivered with a predetermined time difference $t_d$, the test light pulses having the optical frequency $\omega$ of the light from the light source 1 and the optical frequency $\omega+\Delta\omega_A$ resulting from a frequency shift by the optical frequency control unit 3. The two test light pulses have the same pulse width W. The repetition time of the test light pulse is set equal to or longer than the round-trip propagation delay time of the maximum length of the optical fiber under test 10.

Here, AC components $I_1(t)$ and $I_2(t)$ of beat electrical signals output from the optical detection units 25 and 26 are respectively given by (Expression 8) and (Expression 9) below, with respect to the output time t and the optical frequency $\omega$ of the coherent light from the light source 1, the frequency shift $\Delta\omega_A$, and the pulse width W of the test light pulse.

Math. 8

$$I_1(t) \propto \quad \text{(Expression 8)}$$

$$2E_S^2 \sum_{i=1}^{N}\sum_{j=1}^{N} a_i a_j \cos\{\Delta\omega_A t + \omega\tau_i - (\omega+\Delta\omega_A)\tau_j + \theta(t-\tau_i) - \theta(t-\tau_j) + \theta_{FUT}(\tau)\} \cdot$$

$$rect\left(\frac{t-\tau_i}{W}\right) \cdot rect\left(\frac{t-\tau_j}{W}\right) =$$

$$2E_S^2 R_1(t)\cos(\Delta\omega_A t + \theta_1 + \theta_{FUT}(\tau))$$

Math. 9

$$I_2(t) \propto \quad \text{(Expression 9)}$$

$$2E_S^2 \sum_{i=1}^{N}\sum_{j=1}^{N} b_i b_j \cos\{\delta\omega_A t + \omega\tau_i - (\omega+\Delta\omega_A)\tau_j + \theta(t-\tau_i) - \theta(t-\tau_j) + \theta_{FUT}(\tau)\} \cdot$$

$$rect\left(\frac{t-\tau_i}{W}\right) \cdot rect\left(\frac{t-\tau_j}{W}\right) =$$

$$2E_S^2 R_2(t)\cos(\Delta\omega_A t + \theta_2 + \theta_{FUT}(\tau))$$

Here, $E_S$ is the electric field amplitude of the test light, N is the number of scatterers present in the length direction of each of the optical fibers under test, i ($1 \le i \le N$) is the number of each scatterer, $a_i$, $b_i$ is the reflectance of the scatterer i, $\tau_i$ is the round-trip propagation delay time from the incident end of the optical fiber under test to the scatterer i, $\theta(t)$ is the initial phase of the test light, and $\theta_{FUT}(\tau)$ is a phase change caused by vibration applied to the optical fiber under test and is an object to be measured. $R_1(t)$ and $R_2(t)$ are the backscattering coefficient distributions of the respective optical fibers under test, and according to the assumed conditions, $\theta_{FUT}(\tau)$ is the same between two optical fibers under test. Here, when the time difference between the two test light pulses incident on the respective optical fibers under test is sufficiently shorter than the coherence length of the light source, $\theta(t-\tau_i)-\theta(t-\tau_j)$, which means phase noise from the laser, is very small and negligible. $\theta_1$ and $\theta_2$ are each a phase constant attributed to fading, and conditions for interference caused by fading, in other words, scatterers forming the optical fiber, vary among the optical fibers under test, and thus the phase constants differ from each other.

As seen in (Expression 8) and (Expression 9), the form of the expression for each AC component is substantially the same as that in the first embodiment except that, with the phase term focused on, the term meaning phase noise from the laser is substantially negligible at this stage.

In the stage subsequent to the optical detection units 25 and 26, the electrical signals resulting from branching are synthesized in the mixer 28, and then high frequency components are removed from the signal by the filter 27. The synthetic AC signal resulting from synthesis in the mixer 28 is given by the product of the AC components, and is as described below.

Math. 10

$$I_1(t) \times I_2(t) = 4E_L^2 R_1(t) R_2(t)[\cos\{2(\Delta\omega_A t + \theta_{out}(\tau)) + \theta_1 + \theta_2\} + \cos(\phi_{1,2})] \quad \text{(Equation 10)}$$

The synthetic AC signal can also be treated as in the first embodiment except that, with the phase term focused on, the term meaning phase noise from the laser is substantially negligible at this stage. Accordingly, the calculation processing flow in the calculation processing unit of the present embodiment is the same as that in the first embodiment except that, with reference to FIG. 5, the calculation step in S306 is unnecessary. This is because, in the present embodiment, the time difference is set for the two test light pulses with different frequencies incident on the respective optical fibers under test, and thus a phase change in any section of each optical fiber under test corresponding to the time difference is treated as the signal $\theta_{FUT}(\tau)$ in each of the AC components computed in (Expression 8) and (Expression 9).

As described above, accurate vibration measurement can be implemented by the present embodiment, which differs from the first embodiment in that the distributed optical fiber vibration measurement device causes test light pulses with different frequencies to be incident with a time difference instead of using the local light and that the interference between the resultant plurality of rays of backscattered light is measured as an AC component.

Third Embodiment

Figure 8:
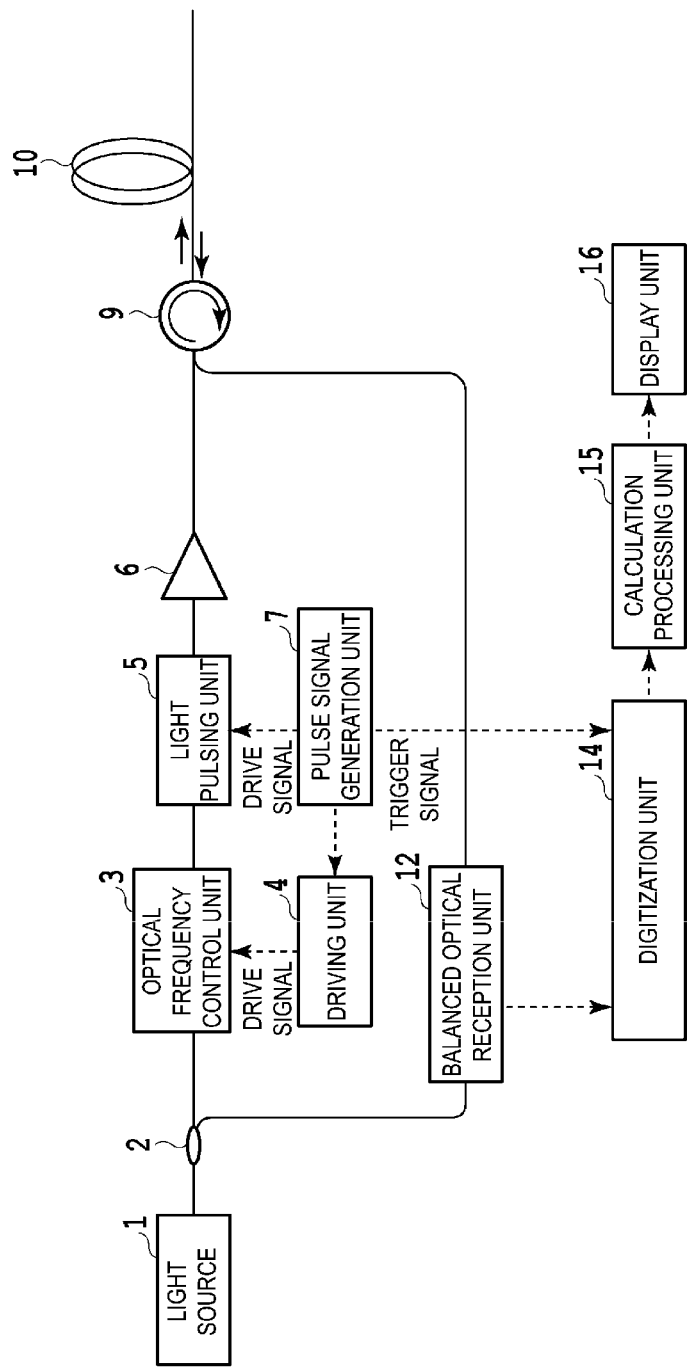
FIG. 8 is a block configuration diagram illustrating a distributed optical fiber vibration measurement device of a third embodiment of the present disclosure.

FIG. 8 is a block configuration diagram illustrating a distributed optical fiber vibration measurement device of a third embodiment. The distributed optical fiber vibration measurement device of the present embodiment branches light from the light source into rays of light used as the test light and the local light, and shifts the frequency of the test light with respect to the frequency of the local light by a plurality of different values to generate frequency-shifted test light at predetermined time intervals (frequency-multiplexed test light). Furthermore, the distributed optical fiber vibration measurement device of the present embodiment causes the test light to enter one optical fiber under test to obtain backscattered light, and multiplexes the backscattered light with the local light for heterodyne detection. Furthermore, the distributed optical fiber vibration measurement device of the present embodiment performs digitization processing on the electrical signal obtained and then uses digital signal processing to perform frequency separation to acquire two AC components. The present embodiment differs from the first embodiment and the second embodiment in that instead of using two optical fibers under test or two balanced optical reception units (or two optical detection units), the present embodiment executes digital signal processing to separate frequency-multiplexed test light into rays of light. Only differences in configuration and signal processing involved in the above-described change will be described below.

Output light from the light source 1 emitting coherent light is branched into two lines by the branching element 2. One ray of the branched light is used as local light, whereas the other is incident on an optical frequency control unit 3 as test light. The optical frequency control unit 3 modulates the optical frequency in two stages (shifts the frequency by different values) at predetermined time intervals. For the test light, the light pulsing unit 5 forms two test light pulses including a first test light pulse having an optical frequency $\omega+\omega_1$ and a second test light pulse having an optical frequency $\omega+\omega_2$, and causes the test light pulses to enter the optical fiber under test 10 via the optical amplifier 6.

The backscattered light generated in the optical fiber under test 10 travels through the optical circulator 9 and is converted into an electrical signal by the balanced optical reception unit 12. The electrical signal is converted into a digital signal by the digitization unit 14, and the digital signal is subjected to signal processing by the calculation processing unit 15. The balanced optical reception unit 12 causes test light (first test light pulse and second test light pulse) to enter one optical fiber under test to obtain backscattered light, and multiplexes the backscattered light with the local light for heterodyne detection to converts the backscattered light into an electrical signal.

Figure 9:
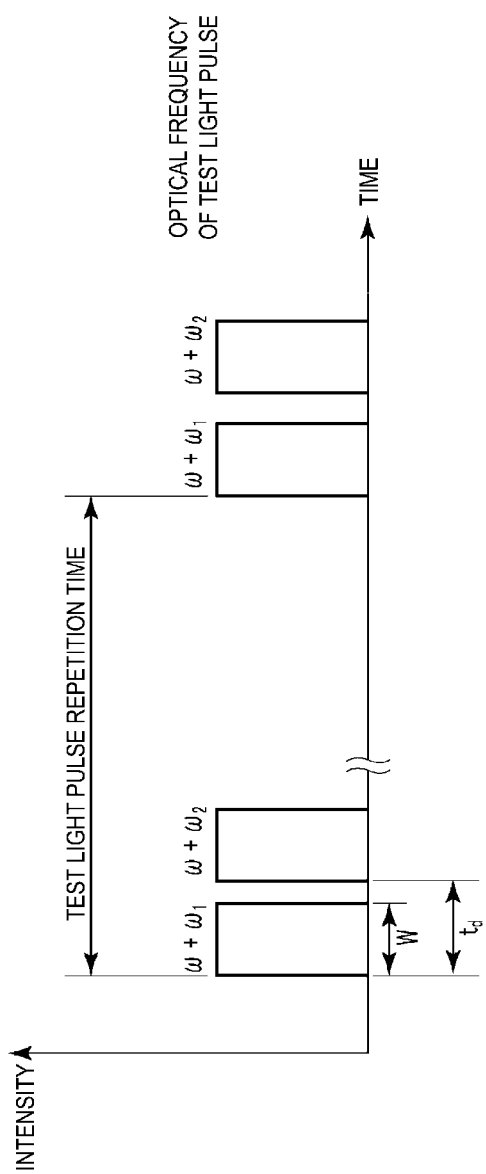
FIG. 9 is a diagram illustrating a test light pulse delivery sequence according to the third embodiment of the present disclosure.

FIG. 9 illustrates a test light pulse delivery sequence according to the present embodiment. Light from the light source 1 is frequency-shifted by the optical frequency control unit 3, and two test light pulses having the optical frequencies $\omega+\omega_1$ and $\omega+\omega_2$ are repeatedly delivered with a predetermined time difference $t_d$. The two test light pulses (third test light pulse and fourth test light pulse) has the same pulse width W. The repetition time of the test light pulse is set equal to or longer than the round-trip propagation delay time of the maximum length of the optical fiber under test 10.

Here, the beat electrical signal output from the balanced optical reception unit 12 is digitized by the digitization unit 14, and then in the calculation processing unit 15, the resultant signal is separated into two signals having beat frequencies $\omega 1$ and $\omega 2$ by using a digital filter. The AC components $I_1(t)$ and $I_2(t)$ of the two signals resulting from the separation are respectively given by (Expression 11) and (Expression 12) below, with respect to the output time t and the optical frequency $\omega$ of the coherent light from the light source 1, frequency shifts $\omega_1$ and $\omega_2$, and the pulse width W of the test light pulse.

Math. 11

$$I_1(t) \propto 2E_L E_S \sum_{i=1}^{N} a_i \cos\{\omega_1 t - \omega_1 \tau_i + \theta(t-\tau_i) - \theta(t) + \theta_{FUT}(\tau)\} \cdot \text{rect}\left(\frac{t-\tau_i}{W}\right) = \qquad \text{(Expression 11)}$$

$$2E_L E_S R_1(t)\cos(\omega_1 t + \theta_1 + \Delta\theta_L(t) + \theta_{FUT}(\tau))$$

Math. 12

$$I_2(t) \propto \qquad \text{(Expression 12)}$$

$$2E_L E_S \sum_{i=1}^{N} a_i \cos\{\omega_2(t-t_d) - \omega_2 \tau_i + \theta(t-t_d-\tau_i) - \theta(t) + \theta_{FUT}(\tau-t_d)\} \cdot \text{rect}\left(\frac{t-t_d-\tau_i}{W}\right) =$$

$$2E_L E_S R_2(t-t_d)\cos(\omega_2 t + \theta_2 + \Delta\theta'_L(t) + \theta_{FUT}(\tau-t_d))$$

Here, $E_L$ and $E_S$ are respectively the electric field amplitudes of the local light and the test light, N is the number of scatterers present in the length direction of each of the optical fibers under test, i ($1 \le i \le N$) is the number of each scatterer, $a_i$ is the reflectance of the scatterer i, $\tau_i$ is the round-trip propagation delay time from the incident end of the optical fiber under test to the scatterer i, $\theta(t)$ is the initial phase of the test light, and $\theta_{FUT}(\tau)$ is a phase change caused by vibration applied to the optical fiber under test and is an object to be measured. $R_1(t)$ and $R_2(t)$ are respectively the backscattering coefficient distributions of the optical fibers under test at $\omega_1$ and $\omega_2$. $\Delta\theta_L(t)$ is the initial phase difference of light between the time of output of the test light pulse and the time of interference with the local light, meaning phase noise from the laser, and is eventually negligible as in the first and second embodiments.

Here, the two AC components according to the present embodiment mean the results of the interference between the backscattered light resulting from the first test light pulse and local light and the results of the interference between the backscattered light resulting from the second test light pulse, that is incident with the time difference $t_d$, and local light. Accordingly, the above-described two AC components are signals containing the influences of vibrations differing from each other in time by $t_d$, i.e., $\theta_{FUT}(\tau)$ and $\theta_{FUT}(\tau-t_d)$, respectively. $\theta_1$ and $\theta_2$ are each a phase constant attributed to fading, and are different constants because the first test light pulse and the second test light pulse have different optical frequencies.

Now, assuming that T is a measurable vibration frequency, in a case where $t_d \ll 1/T$ holds true, i.e., in a case where the time difference $t_d$ is very small with respect to the vibration period, it is possible to assume that $\theta_{FUT}(\tau) \approx \theta_{FUT}(\tau-t_d)$. As a specific example, assuming that the measurable maximum vibration frequency is 20 kHz, which is the upper limit of the human audible range, and $t_d$=200 ns, the time difference $t_d$ corresponds to one-250th of a vibration period of 50 µs, and thus even the maximum value is approximately 0.03 rad in terms of the phase change amount, which is small enough to be negligible.

The AC components indicated in (Expression 11) and (Expression 12) are synthesized by digital signal processing in the calculation processing unit 15. This synthetic AC signal is corrected with the time shift of the AC component $I_2(t)$ by the incident time difference $t_d$ taken into account, and is further modified as follows, by using $\theta_{FUT}(\tau) \approx \theta_{FUT}(\tau-t_d)$.

Math. 13

$$I_1(t) \times I_2(t+t_d) = 4E_L^2 E_S^2 R_1(t) R_2(t)[\cos\{(\omega_1+\Omega_2)t + 2(\Delta\theta_L(t) + \theta_{OUT}(t)) + \theta_1 + \theta_2\} + \cos((\omega_1-\omega_2)t + \phi_{1,2})] \qquad \text{(Equation 13)}$$

(Equation 13) indicates that the synthetic AC signal represented by this equation includes a frequency component of the sum $\omega_1+\omega_2$ of the optical frequency shifts applied to the first test light pulse and the second test light pulse, and a frequency component of the difference $\omega_1-\omega_2$ between the optical frequency shifts applied to the first test light pulse and the second test light pulse. By using a low-pass filter, the frequency component of the difference $\omega_1-\omega_2$ is extracted. As is the case with the first embodiment and the second embodiment, the distributed optical fiber vibration measurement device can extract the phase term using an orthogonal component shifted by 90 degrees and execute subtraction of the known optical frequency shifts $\omega_1$ and $\omega_2$ applied to the first test light pulse and the second test light pulse, to learn the phase constant difference $\phi_{1,2}$. Subsequently, the distributed optical fiber vibration measurement device can execute processing as is the case with the first embodiment.

Here, when a reception band is designed, given that the signal band of the test light pulse is 2/W, the condition for the design needs to be such that, for the optical frequencies of the first test light pulse and the second test light pulse, $|\omega_1-\omega_2|\geq 1/W$. Additionally, the band for the balanced optical reception unit 12 and the digitization unit 14 needs to be $2(\omega_1+\omega_2)$ or more on the basis of the Nyquist theorem.

As described above, in the present embodiment, the distributed optical fiber vibration measurement device produces frequency-multiplexed test light, causes rays of test light with different frequencies to simultaneously enter one optical fiber under test to obtain backscattered light, and multiplexes the backscattered light with the local light for heterodyne detection. In addition, the distributed optical fiber vibration measurement device performs frequency separation using digital signal processing executed by one optical detection unit (balanced optical reception unit 12), acquiring two AC signals. This enables the present embodiment, which is different from the first embodiment, to implement accurate vibration measurement.

Note that, in the present embodiment as well, under the condition that the time difference $t_d$ is very small compared to the vibration period, more than two frequencies may be multiplexed and that, in this case, assuming that the number of synthetic AC signals combined is also increased, multiplexing of even three or more frequencies can be implemented.

The present embodiment can be implemented without the use of two or more optical fibers under test or optical detection units, allowing the configuration to be simplified compared to the first embodiment and the second embodiment, thus enabling an economical device to be provided.

Fourth Embodiment

Figure 10:
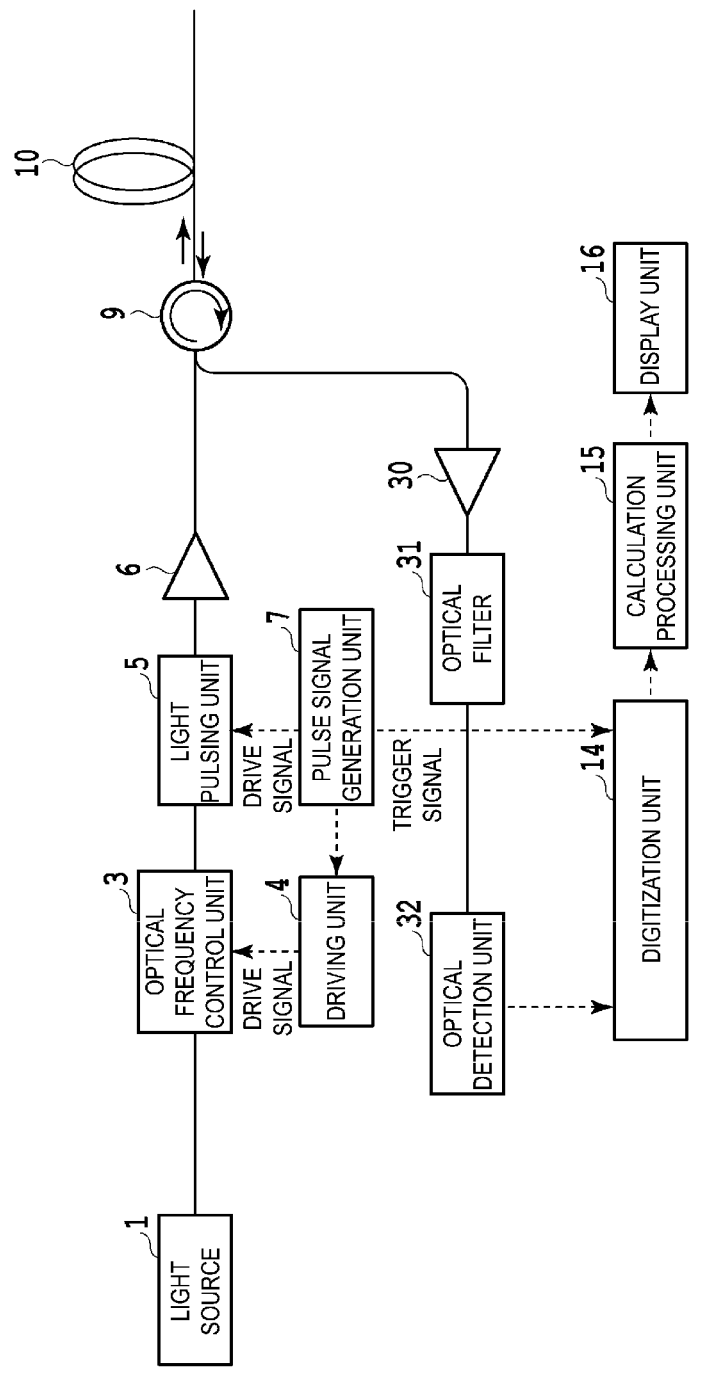
FIG. 10 is a block configuration diagram illustrating a distributed optical fiber vibration measurement device of a fourth embodiment of the present disclosure.

FIG. 10 is a block configuration diagram illustrating a distributed optical fiber vibration measurement device according to a fourth embodiment. The distributed optical fiber vibration measurement device of the present embodiment uses test light frequency-coded at predetermined time intervals, causes the test light to enter the optical fiber under test to obtain rays of backscattered light, uses the optical detection unit to receive interference between the rays of backscattered light, and subjects the resultant signal to digitization processing and then to digital signal processing to frequency-separate the signal into any two AC components. A difference from the third embodiment is that, instead of the signals corresponding to the first test light pulse and the second test light pulse of the third embodiment, test light pulses each frequency-multiplexed and coded are used. Specifically, the present embodiment uses a unit for acquiring the AC components of two electrical signals which differs from the corresponding unit in the third embodiment, and only differences in configuration and signal processing involved in the above-described change will be described below.

Output light from the light source 1 emitting coherent light is incident on the optical frequency control unit 3 as test light. The optical frequency control unit 3 modulates the optical frequency in four stages at predetermined time intervals. For the test light, the light pulsing unit 5 forms one test light pulse (one test light pulse in which a third test light pulse, a fourth test light pulse, a fifth test light pulse, and a sixth test light pulse are continuously formed) including the frequency component modulated in four stages, and is incident on the optical fiber under test 10 via the optical amplifier 6. Backscattered light generated in the optical fiber under test 10 travels through the optical circulator 9 and is pre-amplified by an optical amplifier 30, and the light then travels through an optical filter 31 for removing spontaneous emission from the optical amplifier 30 and is converted into an electrical signal by an optical detection unit 32. The electrical signal is converted into a digital signal by the digitization unit 14, and the digital signal is subjected to signal processing by the calculation processing unit 15.

FIG. 11 is a diagram illustrating a test light pulse delivery sequence according to the present embodiment. The light from the light source 1 is modulated in four stages $\omega_A$, $\omega_B$, $\omega_A+\omega_1$, and $\omega_B+\omega_2$ at predetermined time intervals W. The repetition time of the test light pulse is set equal to or longer than the round-trip propagation delay time of the maximum length of the optical fiber under test 10.

Here, given that the signal band of each frequency component of the test light pulse is 2/W, the condition for the design needs to be such that, for the reception band, $|\omega_1-\omega_2|\geq 1/W$. Additionally, the band for the optical detection unit 32 and the digitization unit 14 needs to be $2(\omega_1+\omega_2)$ or more on the basis of the Nyquist theorem. Furthermore, the difference between OA and OB needs to be larger than the reception band for the optical detection unit 32 and the digitization unit 14. With the design as described above, the optical detection unit 32 detects the beat frequency components $\omega_1$ (corresponding to the difference frequency component between $\omega_A$ and $\omega_A+\omega_1$) and $\omega_2$ (corresponding to the difference frequency component between $\omega_B$ and $\omega_B+\omega_2$).

Here, the beat electrical signal is output from the optical detection unit 32, and is digitized by the digitization unit 14. Subsequently, the calculation processing unit 15 employs a digital filter to separate the beat electrical signal into two signals having the beat frequencies $\omega_1$ and $\omega_2$. The AC components $I_1(t)$ and $I_2(t)$ of the two signals resulting from the separation at this time are respectively given by (Expression 14) and (Expression 15) below, with respect to the output time t of the coherent light from the light source.

Math. 14

$$I_1(t) \propto \hspace{4cm} \text{(Expression 14)}$$
$$2E_S^2 \sum_{i=1}^{N}\sum_{j=1}^{N} a_i a_j \cos\{\omega_1 t + \omega_A \tau_i - (\omega_1+\omega_A)\tau_j + \theta(t-\tau_i) - \theta(t-\tau_j) + \theta_{FUT}(\tau)\} \cdot$$
$$rect\left(\frac{t-\tau_i}{W}\right)\cdot rect\left(\frac{t-\tau_j}{W}\right) =$$
$$2E_S^2 R_1(t)\cos(\omega_1 t + \theta_1 + \theta_{FUT}(\tau))$$

-continued

Math. 15

$$I_2(t) \propto \qquad \text{(Expression 15)}$$

$$2E_S^2 \sum_{i=1}^{N} \sum_{j=1}^{N} a_i a_j \cos\{\omega_2(t-W) + \omega_B \tau_i - (\omega_2 + \omega_B)\tau_j +$$

$$\theta(t - W - \tau_i) -$$
$$\theta(t - W - \tau_j) + \theta_{FUT}(\tau - W)\} \cdot$$
$$rect\left(\frac{t - W - \tau_i}{W}\right) \cdot rect\left(\frac{t - W - \tau_j}{W}\right) =$$
$$2E_S^2 R_2(t)\cos(\omega_2 t + \theta_2 + \theta_{FUT}(\tau - W))$$

Here, $E_S$ is the electric field amplitude of the test light, N is the number of scatterers present in the length direction of each of the optical fibers under test, i ($1 \le i \le N$) is the number of each scatterer, $a_i$ is the reflectance of the scatterer i, $\tau_i$ is the round-trip propagation delay time from the incident end of the optical fiber under test to the scatterer i, $\theta(t)$ is the initial phase of the test light, and $\theta_{FUT}(\tau)$ is a phase change caused by vibration applied to the optical fiber under test and is an object to be measured. $R_1(t)$ and $R_2(t)$ are the backscattering coefficient distributions of the respective optical fibers under test at OA and OB. Here, when the time difference W between the frequency components OA and OB incident on the optical fiber under test is sufficiently shorter than the coherence length of the light source, $\theta(t-\tau_i)-\theta(t-\tau_j)$ and $\theta(t-W-\tau_i)-\theta(t-W-\tau_j)$, which mean phase noise from the laser, are very small and negligible. $\theta_1$ and $\theta_2$ are each a phase constant attributed to fading, and differ from each other due to the different optical frequencies of the two test light pulses.

Now, assuming that T is a measurable vibration frequency, in a case where W<<1/T holds true, i.e., in a case where the time difference W is very small with respect to the vibration period, it is possible to assume that $\theta_{FUT}(\tau) \approx \theta_{FUT}(\tau-W)$. As a specific example, assuming that the measurable maximum vibration frequency is 20 kHz, which is the upper limit of the human audible range, and W=200 ns, the time difference W corresponds to one-250th of a vibration period of 50 μs, and thus even the maximum value is approximately 0.03 rad in terms of the phase change amount, which is small enough to be negligible.

The AC components indicated in (Expression 14) and (Expression 15) are synthesized by digital signal processing in the calculation processing unit 15. This synthetic AC signal is corrected with the time shift of the AC component $i_2(t)$ by the incident time difference W taken into account, and is further modified as represented in (Equation 16) below, by using $\theta_{FUT}(\tau) \approx \theta_{FUT}(\tau-W)$.

Math. 16

$$I_1(t) \times I_2(t+W) = 2E_S^4 R_1(t) R_2(t)[\cos\{(\omega_1+\omega_2)t + 2\theta_{FUT}(\tau) + \theta_1 + \theta_2\} \cos((\omega_1-\omega_2)t + \phi_{1,2})] \qquad \text{(Equation 16)}$$

(Equation 16) indicates that the synthetic AC signal represented by this equation includes a frequency component of the sum $\omega_1+\omega_2$ of the optical frequency shifts applied to the two test light pulses, and a frequency component of the difference $\omega_1-\omega_2$ between the optical frequency shifts applied to the two test light pulses. By using a low-pass filter for the above-described signals, the frequency component of the difference $\omega_1-\omega_2$ is extracted. As is the case with the first embodiment and the second embodiment, the distributed optical fiber vibration measurement device can extract the phase term using an orthogonal component shifted by 90 degrees and execute subtraction of the known optical frequency shifts $\omega_1$ and $\omega_2$ to learn the phase constant difference $\phi_{1,2}$. Subsequently, the distributed optical fiber vibration measurement device can execute processing as is the case with the second embodiment.

In spite of the use of different acquisition units, the distributed optical fiber vibration measurement device described in the first to fourth embodiments can learn, from the synthetic AC component, the phase constant difference attributed to fading by acquiring the two AC components under a condition as described below. This means that, even in a case where the distributed optical fiber vibration measurement device compares the amplitudes of the two AC components and selects the AC component with a higher signal-to-noise ratio, thus changing the selected AC component itself, a difference in phase constant difference can be corrected when a change in the time direction is computed. Thus, the two AC components can be used to implement accurate vibration measurement that is less susceptible to fading noise. Here, the above-described condition described below is the condition that the optical frequencies of the test light pulses or the optical fibers under test or both vary. Additionally, the above-described change in the time direction refers to a temporal change in the phase of the AC component selected for each repeated incidence of the test light pulse.

Additionally, in the embodiment in which the phase is computed from the interference of backscattered light, if optical frequency drift in the light source or the optical frequency control unit is present, the optical frequency drift becomes a direct factor that increases phase errors in a process described below. However, by taking a measure for monitoring the beat frequency without removing high frequency components of the synthetic AC component as in the first embodiment, the optical frequency drift can be corrected in other embodiments. Here, the above-described process described below is a process in which the distributed optical fiber vibration measurement device computes the phase from the AC component or the synthetic AC component, and a process of computing a phase change with respect to time.

Note that, in the first embodiment to the fourth embodiment, the calculation processing unit 15 can be implemented by a computer and a program and that the program can be recorded in a recording medium or provided through a network.

In addition, various disclosures can be formed by appropriately combining a plurality of constituent elements disclosed in the above embodiments. For example, some components may be deleted from all the components shown in the embodiment. Furthermore, components of different embodiments may be appropriately combined.

REFERENCE SIGNS LIST

1 Light source
2 Branching element
3 Optical frequency control unit
4 Driving unit
5 Light pulsing unit
6 Optical amplifier
7 Pulse signal generation unit
8 Branching element
9 Optical circulator
10 Optical fiber under test
11 Branching element
12, 13 Balanced optical reception unit 14 Digitization unit
15 Calculation processing unit
16 Display unit
17, 27 Filter
18, 28 Mixer
23, 24 Optical filter
25, 26 Optical Detection unit
21, 22, 30 Optical Amplifier
31 Optical filter
32 Optical detection unit

The invention claimed is:

1. A distributed optical fiber vibration measurement device for causing a first test light pulse to enter a plurality of optical fibers under test that are integrated to generate first backscattered light at points of the plurality of optical fibers under test and heterodyne-detecting the first backscattered light to measure vibration applied to positions of an optical fiber under test of the plurality of optical fibers under test, the distributed optical fiber vibration measurement device comprising:
   a phase constant difference computation unit configured to cause the first backscattered light generated at the points of the plurality of optical fibers under test to interfere with another light having an optical frequency different from an optical frequency of the first test light pulse to obtain two AC components and determine a phase constant difference from the two AC components;
   a phase distribution data creation unit configured to compare amplitudes between the two AC components obtained by causing the first backscattered light generated at the points of the plurality of optical fibers under test to interfere with the other light and select, for each of the points, phase data regarding an AC component of the two AC components having a larger amplitude to create phase distribution data with the phase data arranged over time; and
   a vibration measurement unit configured to identify, from the phase constant difference and the phase distribution data, an optical path length difference between any two points of the optical fiber under test to measure vibration of the optical fiber under test.

2. The distributed optical fiber vibration measurement device according to claim 1,
   wherein the other light is second backscattered light generated by causing a second test light pulse having an optical frequency different from the optical frequency of the first test light pulse to enter the plurality of optical fibers under test at a predetermined interval from the first test light pulse.

3. A distributed optical fiber vibration measurement device for causing a first test light pulse and a second test light pulse having an optical frequency different from an optical frequency of the first test light pulse to enter an optical fiber under test to generate first backscattered light and second backscattered light at points of the optical fiber under test and heterodyne-detecting the first backscattered light and the second backscattered light to measure vibration applied to positions of the optical fiber under test, the distributed optical fiber vibration measurement device comprising:
   a phase constant difference computation unit configured to cause the first backscattered light and the second backscattered light to interfere respectively with another light having an optical frequency different from optical frequencies of the first test light pulse and the second test light pulse to obtain two AC components and determine a phase constant difference from the two AC components;
   a phase distribution data creation unit configured to compare amplitudes between the two AC components obtained by causing the first backscattered light and the second backscattered light to interfere with the other light respectively and select, for each of the points, phase data regarding an AC component of the two AC components having a larger amplitude to create phase distribution data with the phase data arranged over time; and
   a vibration measurement unit configured to identify, from the phase constant difference and the phase distribution data, an optical path length difference between any two points of the optical fiber under test to measure vibration of the optical fiber under test.

4. The distributed optical fiber vibration measurement device according to claim 3,
   wherein the other light includes third backscattered light and fourth backscattered light generated by causing a third test light pulse and a fourth test light pulse having optical frequencies different from the optical frequencies of the first test light pulse and the second test light pulse to enter the optical fiber under test at predetermined intervals from the first test light pulse and the second test light pulse.

5. A distributed optical fiber vibration measurement method of causing a first test light pulse to enter a plurality of optical fibers under test that are integrated to generate first backscattered light at points of the plurality of optical fibers under test and heterodyne-detecting the first backscattered light to measure vibration applied to positions of an optical fiber under test of the plurality of optical fibers under test, the distributed optical fiber vibration measurement method comprising:
   causing the first backscattered light generated at the points of the plurality of optical fibers under test to interfere with another light having an optical frequency different from an optical frequency of the first test light pulse to obtain two AC components and determining a phase constant difference from the two AC components;
   comparing amplitudes between the two AC components obtained by causing the first backscattered light generated at the points of the plurality of optical fibers under test to interfere with the other light and selecting, for each of the points, phase data regarding an AC component of the two AC components having a larger amplitude to create phase distribution data with the phase data arranged over time; and
   identifying, from the phase constant difference and the phase distribution data, an optical path length difference between any two points of the optical fiber under test to measure vibration of the optical fiber under test.

6. A distributed optical fiber vibration measurement method of causing a first test light pulse and a second test light pulse having an optical frequency different from an optical frequency of the first test light pulse to enter an optical fiber under test to generate first backscattered light and second backscattered light at points of the optical fiber under test and heterodyne-detecting the first backscattered light and the second backscattered light to measure vibration applied to positions of the optical fiber under test, the distributed optical fiber vibration measurement method comprising:
   causing the first backscattered light and the second backscattered light to interfere respectively with another light having an optical frequency different from optical frequencies of the first test light pulse and the second test light pulse to obtain two AC components and determining a phase constant difference from the two AC components;

comparing amplitudes between the two AC components obtained by causing the first backscattered light and the second backscattered light to interfere with the other light respectively and selecting, for each of the points, phase data regarding an AC component of the two AC components having a larger amplitude to create phase distribution data with the phase data arranged over time; and identifying, from the phase constant difference and the phase distribution data, an optical path length difference between any two points of the optical fiber under test to measure vibration of the optical fiber under test.

* * * * *